(12) United States Patent
Kobashi

(10) Patent No.: US 10,366,032 B2
(45) Date of Patent: Jul. 30, 2019

(54) INFORMATION PROCESSING APPARATUS AND MULTIPATH CONTROL METHOD

(71) Applicant: FUJITSU LIMITED, Kawasaki-shi, Kanagawa (JP)

(72) Inventor: Kyuu Kobashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 14/990,039

(22) Filed: Jan. 7, 2016

(65) Prior Publication Data
US 2016/0246749 A1    Aug. 25, 2016

(30) Foreign Application Priority Data
Feb. 23, 2015  (JP) .................................. 2015-032954

(51) Int. Cl.
*G06F 13/40*   (2006.01)
*G06N 7/00*    (2006.01)

(52) U.S. Cl.
CPC ......... *G06F 13/4022* (2013.01); *G06N 7/005* (2013.01)

(58) Field of Classification Search
None
See application file for complete search history.

(56) References Cited

U.S. PATENT DOCUMENTS

| 2005/0251548 | A1  | 11/2005 | Hayashi et al. |
| 2007/0088930 | A1* | 4/2007  | Matsuda ............. G06F 12/0813 711/170 |
| 2009/0198832 | A1* | 8/2009  | Shah ................... H04L 41/0668 709/239 |
| 2014/0250268 | A1* | 9/2014  | Traut .................. G06F 12/0862 711/113 |

FOREIGN PATENT DOCUMENTS

| JP | 2000-298555 | 10/2000 |
| JP | 2005-321959 | 11/2005 |

* cited by examiner

*Primary Examiner* — Henry Tsai
*Assistant Examiner* — Aurangzeb Hassan
(74) *Attorney, Agent, or Firm* — Staas & Halsey LLP

(57) ABSTRACT

An information processing apparatus is connected through a plurality of paths to a plurality of controllers included in a storage device and includes a processor. The processor is configured to issue, to the storage device, an inquiry about a recommended path through which a data access command is to be issued to the storage device. The processor is configured to compare a delay predictive time with a response predictive time in regard to the data access command. The delay predictive time is a predictive value of a delay time due to a data communication using an inter-controller communication between the plurality of controllers. The response predictive time is a predictive value of a response time when the inquiry is issued to the storage device. The processor is configured to suppress the issuance of the inquiry when the response predictive time is equal to or longer than the delay predictive time.

15 Claims, 9 Drawing Sheets

FIG. 2
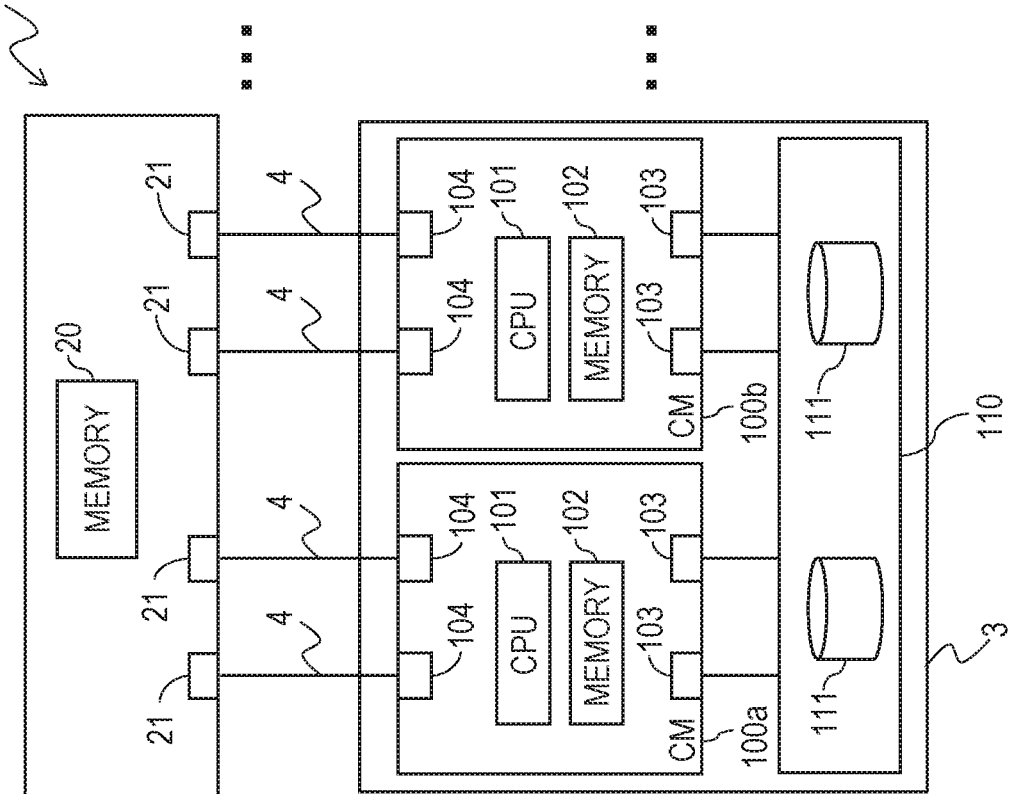
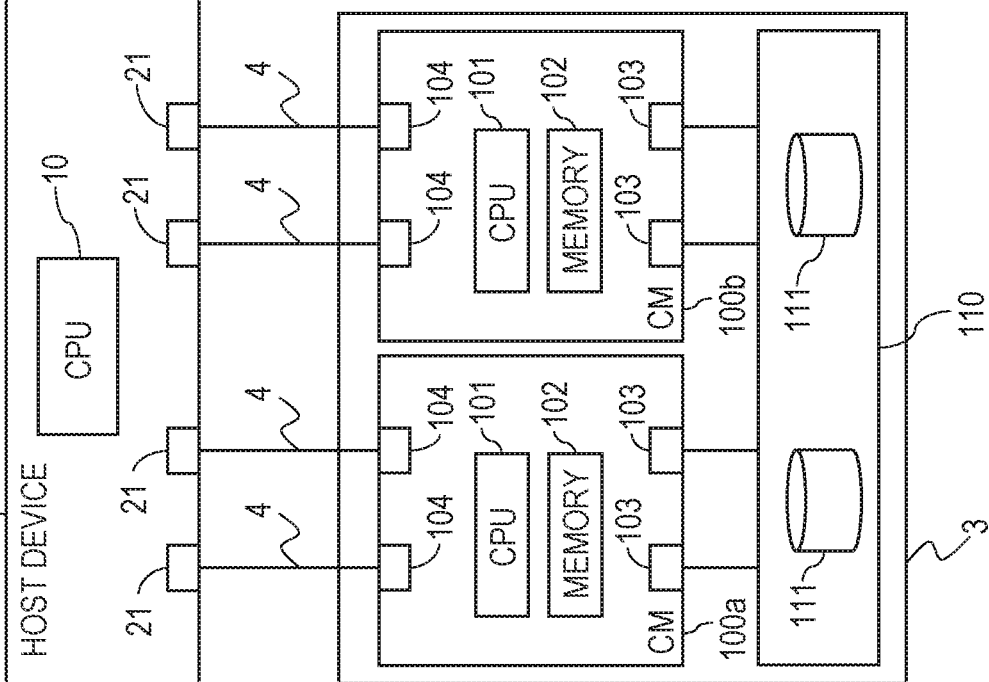

| REPORT REFERRAL FLAG | 1 OR 0 |
|---|---|
| CROSS ACCESS DELAY TIME | 10 ms |
| REPORT REFERRAL RESPONSE TIME | 8 ms |

203

INFORMATION PROCESSING APPARATUS AND MULTIPATH CONTROL METHOD

CROSS-REFERENCE TO RELATED APPLICATION

This application is based upon and claims the benefit of priority of the prior Japanese Patent Application No. 2015-032954, filed on Feb. 23, 2015, the entire contents of which are incorporated herein by reference.

FIELD

The embodiment discussed herein is related to an information processing apparatus and a multipath control method.

BACKGROUND

There is a storage device which conforms to a so-called multipath connection, that is, the device is connected to a host device through a plurality of communication routes (paths).

Recently, a multipath management is known in which Target Port Group Support (TPGS) is used so as to select an optimum path in the multipath connection.

FIG. 7 and FIG. 8 illustrate a path management method of a related art using TPGS.

In the multipath management using TPGS, a REPORT TARGET PORT GROUPS command is issued to the storage device from a multipath driver of the host device through an arbitrary path.

When the storage device receives the REPORT TARGET PORT GROUPS command, the storage device reports appropriate path information by setting, as a recommended (optimized) path, a host port of a controller (CM: controller module) in charge of a logical volume.

In an example illustrated in FIG. 7, a controller A is in charge of a logical volume VA1, and a physical volume A connected to the controller A is used as a physical region corresponding to the logical volume VA1.

When the host device issues a REPORT TARGET PORT GROUPS command to the controller A, the controller A responds "Active/Optimized" as an access state of a port included therein.

In regard to a port of a controller B which is not in charge of the logical volume VA1, for example, "Active/Non-optimized" is responded as an access state thereof. The host device selects an active path on the basis of the responded information.

Recently, in order to reduce a storage region and management costs, a storage device has been adopted in which a thin provisioning function is added to a redundant array of inexpensive disks (RAID) technology. The thin provisioning function is a technology for providing a capacity more than a physical volume capacity to a server in a storage system or a function for virtualizing a volume capacity used by a high-level device such as a server.

In TPGS, path information is managed for each logical volume. For this reason, TPGS is not used in a case, such as the thin provisioning volume, in which the controllers in charge of respective logical blocks of the logical volume are different.

In an example illustrated in FIG. 8, a logical volume VA2 as a thin provisioning volume is illustrated. A physical region of the logical volume VA2 is divided into a physical volume A connected to the controller A and a physical volume B connected to the controller B. That is, a part (physical block b1) of the physical region corresponding to the logical volume VA2 is present in the physical volume A connected to the controller A. The other part thereof (physical block b2) is present in the physical volume B connected to the controller B.

In TPGS in a case of the logical volume VA2 having such a configuration, when notifying of a recommended host access path for each logical volume, data in a block of which a controller in charge is different from the controller in charge of the logical volume has to be transferred between the controllers.

In the example of FIG. 8, transfer of data of the physical block b2 in the physical volume B is performed from the controller B to the controller A. Hereinafter, performing such transfer of data between the controllers is referred to as cross access.

Such a cross access causes a command response to be delayed and deterioration of the performance of a host access.

Here, as a method for suppressing such deterioration of the performance due to cross access, a referral specification is known.

FIG. 9 illustrates the referral specification.

In the referral specification, a REPORT REFERRALS command is used as well as a REPORT TARGET PORT GROUPS command described above. That is, the multipath driver of the host device issues a REPORT REFERRALS command to the storage device.

The storage device responds recommended path information for each block group (chunk) with respect to the received REPORT REFERRALS command. The chunk is a group of a plurality of blocks, and is a unit for controlling the blocks in block management.

The multipath driver in the host device manages the path information of each chunk and selects an access path for each chunk. Hereinafter, path information of a chunk may also be referred to as a chunk, for the sake of simplicity.

The host device stores a set of path information, which is acquired for each chunk by issuing a REPORT REFERRALS command, as path management information (a path information cache) in a memory.

Accordingly, a path through which an input/output (IO) command to be subsequently issued for the same chunk may be selected with reference to the path information cache without issuing a REPORT REFERRALS command.

Related techniques are disclosed in, for example, Japanese Laid-open Patent Publication No. 2005-321959 and Japanese Laid-open Patent Publication No. 2000-298555.

In such a storage system of the related art, it may be considered that the data in the storage device is divided into chunks more than a maximum number of path information to be held in a memory assigned as the path information cache.

When the data in the storage device is divided into chunks more than a maximum number of path information to be held in a memory assigned as the path information cache, chunk information for the entire storage device is not held in the path information cache so that, in the path information cache, old path information or path information less frequently used is overwritten with new path information.

Therefore, so as to issue an IO command for a chunk when path information thereof is deleted from the path information cache, a REPORT REFERRALS command is issued again, the path information is acquired again, and thereafter, the IO command is issued.

Specifically, to issue an IO command for a chunk when path information thereof is deleted from the path information cache, a multipath driver of a host device performs processing of (i) to (iv) described below.

(i) searching the path information cache for path information of a chunk for which the IO command is to be issued (ii) issuing a REPORT REFERRALS command to the storage device because path information of the chunk is not present in the path information cache (iii) selecting a path on the basis of information responded from the storage device in response to the REPORT REFERRALS command (iv) issuing the IO command As described above, to issue an IO command for a chunk when path information thereof is deleted from the path information cache, particularly, the processing of (ii) and (iii) are performed, and thus it takes a time for issuing the IO command since a REPORT REFERRALS command is issued.

Even though the referral specification is introduced to suppress an IO delay due to the cross access in the related art, there is a problem that the IO delay gets worse when "a time desired for a REPORT REFERRALS" becomes longer than "a delay time due to the cross access".

SUMMARY

According to an aspect of the present invention, provided is an information processing apparatus connected through a plurality of paths to a plurality of controllers included in a storage device. The information processing apparatus includes a processor. The processor is configured to issue, to the storage device, an inquiry about a recommended path through which a data access command is to be issued to the storage device. The recommended path is one of the plurality of paths. The processor is configured to compare a delay predictive time with a response predictive time in regard to the data access command. The delay predictive time is a predictive value of a delay time due to a data communication using an inter-controller communication between the plurality of controllers. The response predictive time is a predictive value of a response time when the inquiry is issued to the storage device. The processor is configured to suppress the issuance of the inquiry when the response predictive time is equal to or longer than the delay predictive time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an exemplary hardware configuration of a storage system according to an embodiment;

DESCRIPTION OF EMBODIMENT

Figure 1:
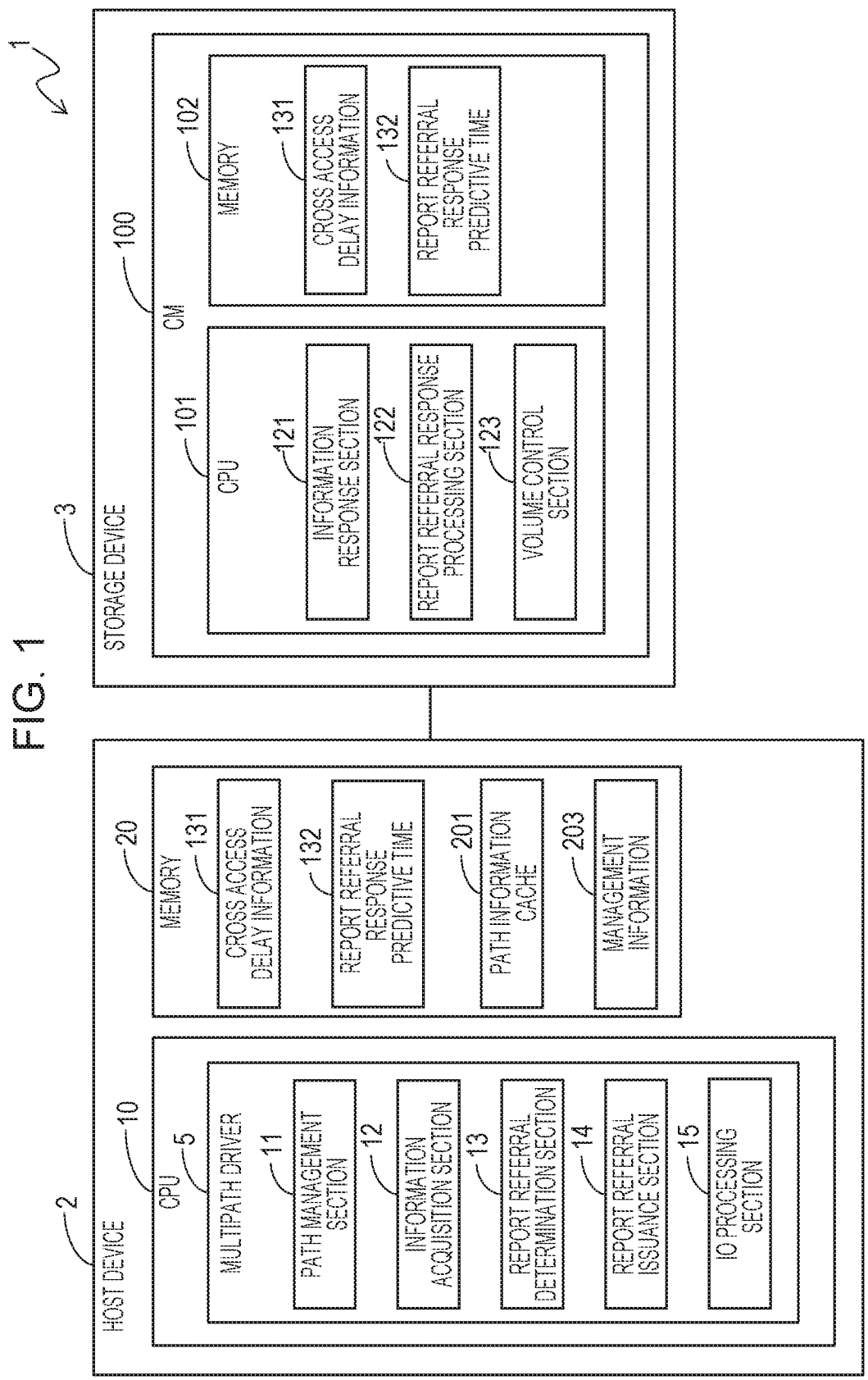
FIG. 1 is a diagram illustrating an exemplary functional configuration of a storage system according to an embodiment.

Hereinafter, an embodiment relating to an information processing apparatus and a multipath control method will be described with reference to drawings. The embodiment described hereinafter is merely an example, and there is no intent to exclude applications of various modification examples or technologies which are not disclosed in the embodiment. That is, the embodiment may be variously transformed within a range not deviating from a scope thereof. Also, each drawing is capable of including not only components illustrated in the drawing, but also other functions, and the like.

FIG. 1 is a diagram illustrating an exemplary functional configuration of a storage system 1 according to the embodiment, and FIG. 2 is a diagram illustrating an exemplary hardware configuration thereof.

As illustrated in FIG. 2, in the storage system 1 according to the embodiment, a host device 2 (information processing apparatus) is communicably connected to a plurality of storage devices 3 (two in the example illustrated in FIG. 1) through a plurality of paths 4 (routes).

Each of the storage devices 3 provides a storage region to the host device 2, and is, for example, a RAID device.

The storage device 3 forms a logical volume (virtual volume) using a physical volume, and provides the logical volume to the host device 2 as the storage region.

In response to a data access request to a logical volume issued from the host device 2, the storage device 3 performs data access to a physical volume (memory device 111) corresponding to the logical volume and gives a response to the host device 2. The plurality of storage devices 3 respectively include similar configurations. Hereinafter, in the drawings, similar reference numerals indicate similar parts, and thus detailed description thereof will not be repeated.

The storage device 3 includes a CM 100a, CM 100b, and a drive enclosure 110 as illustrated in FIG. 2.

The drive enclosure 110 may be provided with one or more (two in the example illustrated in FIG. 2) memory devices 111 (physical disks), and provide storage regions (physical volumes or real volumes) of the memory device 111 to the storage device 3.

For example, the drive enclosure 110 includes a plurality of slots (not illustrated), and a physical volume capacity may be changed any time by inserting the memory device 111 such as a hard disk drive (HDD) or a solid state drive (SSD) into the slot. Also, a RAID may be configured with a plurality of memory devices 111.

The drive enclosure 110 is connected to each of device adapters (DAs) 103 of the CM 100a and each of the DAs 103 of the CM 100b. Any one of the CM 100a and the CM 100b may access the drive enclosure 110 to write or read data. That is, an access route to the memory device becomes redundant by connecting the CM 100a and the CM 100b respectively to the memory device 111 in the drive enclosure 110.

The CM 100a and the CM 100b are controllers (storage control devices) which control an operation in the storage device 3, and performs various controls such as an access control to the memory device 111 in the drive enclosure 110 in accordance with an IO command transmitted from the host device 2. The CM 100a and the CM 100b have configurations similar to each other. Hereinafter, the CM is referred to as the CM 100a or the CM 100b when one of the plurality of CMs has to be discriminated, and as a CM 100 when indicating an arbitrary CM.

In the storage device 3, the CM 100a and the CM 100b are duplexed, and generally, the CM 100a performs various controls as a primary. However, when the primary CM 100a does not work, a secondary CM 100b takes over operations of the CM 100a as the primary.

The CM 100a and the CM 100b are respectively connected to the host device 2 through a channel adapter (CA) 104. The CM 100a and the CM 100b receive an IO command, such as Read or Write, which is transmitted from the host device 2, and controls the memory device 111 through the DAs 103 and the like. In addition, the CM 100a and the CM 100b are connected to each other through an interface (not illustrated) such as a peripheral component interconnect express (PCIe). Communication between the CM 100a and the CM 100b is performed through the interface to perform the cross access.

The CM 100 includes, as illustrated in FIG. 2, a plurality of CAs 104 (two in the example illustrated in FIG. 2) and a plurality of DAs 103 (two in the example illustrated in FIG. 2), and also includes a central processing unit (CPU) 101 and a memory 102.

The CA 104 receives data transmitted from the host device 2 or the like and transmits, to the host device 2 or the like, data output from the CM 100. That is, the CA 104 controls input/output (IO) of the data between the CM and external devices such as the host device 2 or the like. The CA 104 is a network adapter which is communicably connected to the host device 2 and is, for example, a local area network (LAN) interface or the like.

The CM 100 is connected to the host device 2 or the like through a communication line via the CA 104, and receives an IO command and transmits and receives data. In the example illustrated in FIG. 2, the CM 100a and the CM 100b respectively include two CAs 104.

The CA 104 may be, for example, an Internet small computer system interface (iSCSI) or a fibre channel (FC) interface, and may be implemented in various modifications.

The DA 103 is an interface for communicably connecting to the drive enclosure 110, the memory device 111, or the like. The DA 103 is connected to the memory device 111 of the drive enclosure 110, and the CM 100 controls an access to the memory device 111 in accordance with an IO command transmitted from the host device 2.

The CM 100 writes and reads data to and from the memory device 111 through the DA 103. In the example illustrated in FIG. 2, the CM 100a and the CM 100b respectively include two DAs 103. In each of the CM 100a and the CM 100b, the drive enclosure 110 is connected to each DA 103.

Accordingly, any one of the CM 100a and the CM 100b may read and write data from and to the memory device 111 of the drive enclosure 110.

The memory 102 is a storage memory which includes a read-only memory (ROM), a random access memory (RAM), and a non-volatile memory. In the ROM of the memory 102, a software program for storage controls and data for this program are stored. The software program stored in the memory 102 is appropriately read and executed by the CPU 101. The RAM of the memory 102 is used as a primary storage memory or a working memory.

The non-volatile memory of the memory 102 is a memory device, such as a flash memory or an electrically erasable-programmable read-only memory (EEPROM), which retains information even in a state in which power of a device is turned off, and stores therein various setting information or the like in the CM 100. As illustrated in FIG. 1, cross access delay information 131 and a report referral response predictive time 132 to be described later are also stored in the non-volatile memory.

The CPU 101 is a processing device which performs various controls and calculations. The CPU 101 realizes various functions as the storage device 3 by executing an operating system (OS) or programs stored in the memory 102 or the like.

For example, the CPU 101 realizes various functions as a known disk RAID controller, such as realizing a RAID, controlling an access to the memory device 111 in accordance with a host IO from the host device 2, or the like.

As illustrated in FIG. 1, the CPU 101 also functions as an information response section 121, a report referral response section 122, and a volume control section 123.

The CPU 101 of the CM 100 functions as the information response section 121, the report referral response section 122, and the volume control section 123 by executing a control program.

The program (control program) for realizing the functions as the information response section 121, the report referral response section 122, and the volume control section 123 may be provided in a state of being stored in a computer-readable recording medium, for example, a flexible disk, a compact disc (CD) such as CD-ROM, CD-R, or CD-RW, a digital versatile disc (DVD) such as DVD-ROM, DVD-RAM, DVD-R, DVD+R, DVD-RW, DVD+RW, or HD DVD, a Blu-ray disk, a magnetic disk, an optical disk, or a magneto-optical disk. A computer reads the program from the recording medium, transmits and stores the program in an internal memory device or an external memory device, and executes the program. The program may be recorded in a memory device (recording medium) such as a magnetic disk, an optical disk, or a magneto-optical disk, and may be provided from the memory device to the computer through a communication route.

When the functions of the information response section 121, the report referral response section 122, and the volume control section 123 are realized, the program stored in the internal memory device (RAM or ROM of the memory 102 in the embodiment) is executed by a micro-processor (CPU 101 in the embodiment) of the computer. The computer may read and execute the program recorded in the recording medium.

The volume control section 123 forms a logical volume (virtual volume) of a thin provisioning type, and provides the logical volume to the host device 2.

The volume control section 123 manages the memory device 111 (physical disk) included in the storage device 3 as a storage pool. That is, the storage region (physical region) of the memory device 111 is managed as a shared disk pool, and is allocated depending on an amount of the written data in the logical volume. Accordingly, waste of unused physical disks is reduced, and thus efficient operation may be performed.

When a request for writing new data to a logical volume from the host device 2 is detected, the volume control section 123 allocates the new data to a virtual region in the virtual volume.

The logical volume is a virtual memory section to be accessed from the host device 2, and is a volume of the thin provisioning type. The logical volume may be one, or may be two or more with respect to the host device 2.

The volume control section 123 provides a logical (virtual) volume of a size requested by the host device 2 to the host device 2. On the other hand, the volume control section 123 does not initially allocate, inside the storage device, a capacity assigned to the virtual volume, but allocates to a logical volume, in response to a write request from the host device 2, for each block group having a predetermined logical block size, which is referred to as a "chunk", from pooled volumes. A usual size (logical block size) of the chunk is set to between hundreds of KB and hundreds of MB.

As described above, the thin provisioning function divides a logical volume (LUN) by a logical block size (chunk), and allocates a physical region to each chunk and manages the physical region. The physical region is not allocated to any chunk immediately after the LUN is formed (initial state) by the thin provisioning function. When a write request is received from the host device 2, a physical region is allocated to a chunk included in a range of the writing from pooled regions in the storage pool, and data is written on the physical region.

Accordingly, the capacity of the memory device is consumed by only a capacity which is used for the writing by the host device 2, and thus waste of the storage capacity may be reduced.

Methods of providing a virtual volume to the host device 2 by the volume control section 123 using the thin provisioning function may be realized by various known methods, and therefore, a description thereof will be omitted.

The information response section 121 responds to an information acquiring request, which is transmitted from an information acquisition section 12 of the host device 2 to be described later, and transmits response information of (a) and (b) as described below relating to a performance of the storage device 3 to the host device 2.

(a) As first response information, the information response section 121 transmits information relating to a delay time due to the cross access between the CM 100a and the CM 100b included in the storage device 3. Specifically, the information response section 121 transmits a delay time of data having a unit IO size (for example, 512 KB) to the host device 2 as a delay reference value. Hereinafter, the delay reference value is referred to as the cross access delay information 131.

The cross access delay information 131 is obtained, for example, by performing a pre-test, and for example, is recorded in the non-volatile memory of the memory 102 at the time of shipping from a factory.

(b) As second response information, the information response section 121 transmits a time (predictive value) from the issuance of a REPORT REFERRALS command by the host device 2 to the reception of a response thereof by the host device 2, as the report referral response predictive time 132 to the host device 2.

The report referral response predictive time 132 may be known from a result and is obtained by performing a test or the like. The report referral response predictive time 132 is recorded, for example, in the non-volatile memory of the memory 102 at the time of shipping from the factory.

In response to a REPORT REFERRALS command issued from a report referral issuance section 14 of the host device 2 to be described later, the report referral response section 122 responds recommended path information for each block (chunk).

Methods of responding the recommended path information in response to a REPORT REFERRALS command are already known, and thus, a description thereof will be omitted. Hereinafter, issuance of a REPORT REFERRALS command may be merely referred to as issuance of a report referral. Also, a response to a REPORT REFERRALS command may be merely referred to as a response to a report referral.

The host device 2 is an information processing apparatus which writes and reads data to and from a logical volume provided by the connected storage device 3. For example, the host device 2 issues a data access request for reading and writing data with respect to the logical volume provided by the storage device 3.

As illustrated in FIG. 2, the host device 2 includes a CPU 10, a memory 20, and a plurality of host bus adapters (HBA) 21.

The HBA 21 is an adapter to connect to an external device such as the storage device 3 or the like. Each of the HBAs 21 is connected to one of the CAs 104 of CMs 100 provided in each storage device 3, through a communication cable. Hereinafter, a route connected through a communication cable may be referred to as a path 4. As described above, in the storage system 1, the host device 2 and the storage device 3 are communicatively connected to each other through a plurality of paths 4.

The HBA 21 is, for example, a small computer system interface (SCSI) adapter, a fiber channel (FC) adapter, or a serial Advanced Technology Attachment (ATA) adapter. The HBA 21 may be a device to connect to equipment conforming to Integrated Drive Electronics (IDE), Ethernet (registered trade mark), FireWire, universal serial bus (USB), or the like.

The memory 20 is a storage memory including a ROM, a RAM, and a non-volatile memory. In the ROM of the memory 20, a software program for realizing various functions as the host device 2 and data for this program are stored. In the storage system 1, a software program (multipath control program) for realizing a multipath driver 5 (multipath management function) to be described later is stored in the ROM of the memory 20.

The multipath management function manages, for example, the paths 4 connecting between the host device 2 and the storage device 3 and selects, out of the paths 4, a path 4 to be used for accessing data managed by the storage device 3.

The software program in the memory 20 is appropriately read and executed by the CPU 10. The RAM of the memory 20 is used as a primary storage memory or a working memory.

The non-volatile memory of the memory 20 is a memory device, such as a flash memory or an EEPROM, which retains information even in a state in which power of a device is turned off, and stores therein various setting information or the like in the host device 2.

The CPU 10 is a processing device which performs various controls and calculations. The CPU 10 realizes various functions as the host device 2 by executing an OS or programs stored in the memory 20 or the like.

For example, the CPU 10 realizes task functions by executing various task application programs.

The host device 2 is, for example, an information processing apparatus having a server function, and transmits and receives a command of a network attached storage (NAS) or a storage area network (SAN) to and from the storage device 3. The host device 2 writes and read data to and from the logical volume provided by the storage device 3, for example, by transmitting a disk access command such as a read/write command in the NAS to the storage device 3.

The storage device 3 performs the reading or writing of the data with respect to a physical volume corresponding to the storage region of the logical volume in response to an IO request (for example, Read command or Write command) which is performed with respect to the logical volume by the host device 2. The IO request from the host device 2 may be referred to as an IO command or an IO request.

The CPU 10 realizes functions as the multipath driver 5 (a path management section 11, the information acquisition section 12, a report referral determination section 13, a report referral issuance section 14, and an IO processing section 15), as illustrated in FIG. 1, by executing a multipath control program described above.

Thus, the CPU 10 of the host device 2 functions as the multipath driver 5 (the path management section 11, the information acquisition section 12, the report referral determination section 13, the report referral issuance section 14, and the IO processing section 15) by executing the multipath control program.

The program (multipath control program) for realizing the functions as the path management section 11, the information acquisition section 12, the report referral determination section 13, the report referral issuance section 14, and the IO processing section 15 may be provided in a state of being stored in a computer-readable recording medium, for example, a flexible disk, a CD such as CD-ROM, CD-R, or CD-RW, a DVD such as DVD-ROM, DVD-RAM, DVD-R, DVD+R, DVD-RW, DVD+RW, or HD DVD, a Blu-ray disk, a magnetic disk, an optical disk, or a magneto-optical disk. A computer reads the program from the recording medium, transmits and stores the program in an internal memory device or an external memory device, and executes the program. The program may be recorded in a memory device (recording medium) such as a magnetic disk, an optical disk, or a magneto-optical disk, and may be provided from the memory device to the computer through a communication route.

When the functions of the path management section 11, the information acquisition section 12, the report referral determination section 13, the report referral issuance section 14, and the IO processing section 15 are realized, the program stored in the internal memory device (RAM or ROM of the memory 20 in the embodiment) is executed using a micro-processor (CPU 10 in the embodiment) of the computer. The computer may read and execute the program recorded in the recording medium.

The information acquisition section 12 acquires various information from the storage device 3. The information acquisition section 12 stores the acquired information, as management information 203, in the RAM of the memory 20.

Figure 3:
FIG. 3 is a diagram illustrating an example of management information of a storage system according to an embodiment.

FIG. 3 is a diagram for describing the management information 203 of the storage system 1 according to the embodiment.

The management information 203 illustrated in FIG. 3 includes a report referral flag, a cross access delay time, and a report referral response time. In FIG. 3, the management information 203 is illustrated in a table, for the sake of convenience. The information recorded in the management information 203 is not limited thereto, and may be appropriately modified and performed. For example, the management information 203 may include device information, path information, LUN information, or the like.

The information acquisition section 12 checks whether or not the storage device 3 conforms to a report referral. For example, the information acquisition section 12 checks whether or not the storage device 3 conforms to a report referral by issuing an inquiry command of SCSI.

The information acquisition section 12 records the check result as the report referral flag in the management information 203. For example, when the storage device 3 conforms to a report referral, "1" is recorded, and when the storage device 3 does not conform to a report referral, "0" is recorded.

The information acquisition section 12 acquires the cross access delay information 131 and the report referral response predictive time 132 from the host device 2 by issuing an information acquisition request to the storage device 3.

A command may be newly defined as the information acquisition request, which instructs the information response section 121 of the storage device 3 to transmit the cross access delay information 131 and the report referral response predictive time 132. Hereinafter, this command may be referred to as a special inquiry command.

Upon receiving the command (special inquiry command) of the information acquisition request, the information response section 121 of the storage device 3 transmits the cross access delay information 131 and the report referral response predictive time 132 recorded in the memory 102 to the host device 2.

The information acquisition section 12 records the received report referral response predictive time 132 as the report referral response time in the management information 203.

The information acquisition section 12 records the received cross access delay information 131 on a predetermined region in the RAM of the memory 20.

The information acquisition section 12 calculates, on the basis of the cross access delay information 131 acquired from the storage device 3, a predictive value of the delay time when data communication is performed by inter-CM communication (inter-controller communication) between the CM 100a and the CM 100b, that is, when the cross access is performed. Hereinafter, the predictive value of the delay time when the cross access is performed may be referred to as a cross access delay time.

As described above, the cross access delay information 131 is a delay reference value indicating a delay time of data having a unit IO size (for example, 512 KB).

Therefore, the information acquisition section 12 calculates the cross access delay time using Expression (1) described below.

$$\text{cross access delay time} = (\text{IO size/unit IO size}) \times \text{delay reference value} \times \text{cross access probability} \quad (1)$$

Here, the IO size is a size of data to be subject to the IO processing. The cross access probability is a value indicating a probability in which the cross access occurs, and is expressed using Expression (2) described below.

$$\text{cross access probability} = (\text{the number of paths connecting to CMs which are not in charge of the logical volume})/(\text{total number of paths provided to the host device}) \quad (2)$$

Figure 4:
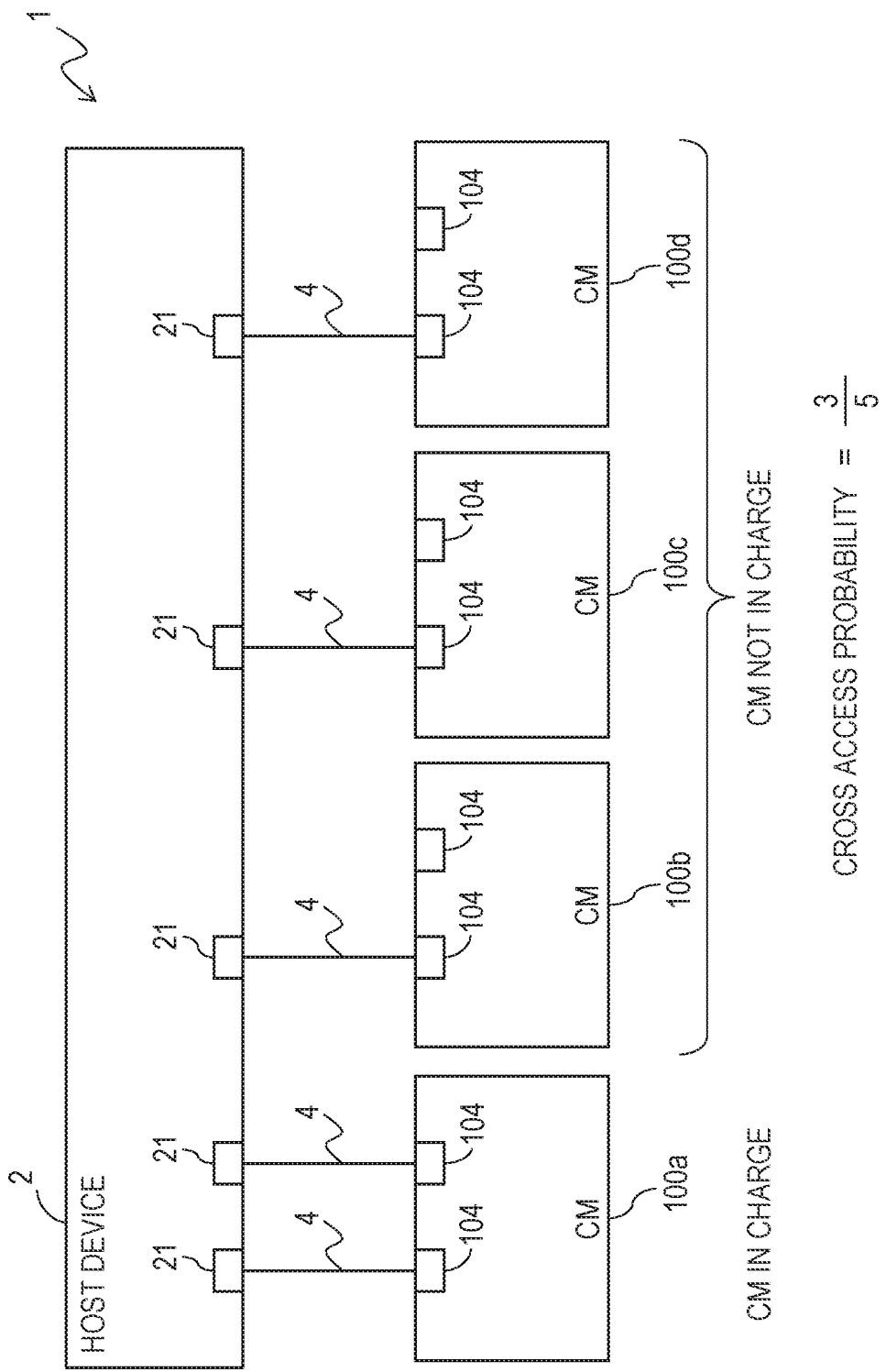
FIG. 4 is a diagram for describing a cross access probability in a storage system according to an embodiment.

FIG. 4 is a diagram for describing the cross access probability in the storage system 1 according to the embodiment.

In an example illustrated in FIG. 4, four CM 100a to CM 100d are connected to the host device 2. The host device 2 and the CM 100a are connected to each other through two paths 4. The host device 2 is respectively connected to the CM 100b to CM 100d through one path 4. In this case, when an IO command is issued to a logical volume of which CM 100a is in charge, "total number of paths provided to the host device" is five (5), and "the number of paths connecting to CMs which are not in charge of the logical volume" is three (3).

Since the CM 100a is in charge of the logical volume to be subject to the IO access, the cross access occurs when the three paths 4 connected to the CM 100b to CM 100d are selected out of the five paths 4 connecting to the host device 2. On the other hand, the cross access does not occur when the two paths 4 connecting to the CM 100a are selected out of the five paths 4 connecting to the host device 2.

Accordingly, in the example illustrated in FIG. 4, the cross access probability becomes "3/5".

In addition, for example, when the cross access delay information 131 indicates that the delay time of data having an IO size of 512 KB is 10 ms", the unit IO size is considered to be 512 KB, and the delay reference value is considered to be 10 ms.

The delay time due to the cross access depends on the performance of the storage device 3, the configuration thereof, an IO size, or the like.

In this case, for example, when the host device 2 reads a logical volume of which the CM 100a is in charge and the IO size of which is 1 MB, the cross access delay time may be obtained in accordance with Expression (1) as follows.

$$\text{cross access delay time} = (1 \text{ MB}/512 \text{ KB}) \times 10 \text{ ms} \times 3/5$$
$$= (1024/512) \times 10 \times 3/5$$
$$= 12 \text{ ms}$$

This cross access delay time corresponds to a delay predictive time which is a predictive value of a delay time due to the data communication (cross access) using the inter-CM communication between the plurality of CMs 100.

As illustrated in Expression (1), the cross access delay time is a value which is obtained by multiplying the delay time due to the cross access when data having the IO size is transmitted with the cross access probability. That is, the cross access delay time is a predictive value of the delay time due to the cross access, and is a statistically expected value.

If the cross access probability is not considered, in a case where a delay of 10 ms occurs due to the cross access and it takes 8 ms to acquire the report referral, it is concluded that IO processing may be performed in a shorter time when the report referral is issued.

However, for example, when the two paths 4 are connected and the cross access probability is ½, the delay time due to the cross access as the expected value reaches 10 ms×½=5 ms, and this indicates that a faster response may be expected when the report referral is not issued. It is needless to say that the above-described value is an expected value. While the delay does not occur when a CM 100 in charge is connected, and the delay reaches 10 ms when a CM 100 not in charge is connected, the values are averaged as a whole, and thus the averaged value may be considered as the expected value.

The information acquisition section 12 records the calculated cross access delay time as described above as the cross access delay time in the management information 203.

In the method described above in which the information acquisition section 12 issues the information acquisition request (special inquiry command) to the storage device 3, the storage device 3 is required to have a function for responding the cross access delay information 131 and the report referral response predictive time 132 in response to the received special inquiry command.

Regarding a storage device 3 which does not have the function, instead of issuing the special inquiry command described above, the information acquisition section 12 may acquire the cross access delay information 131 and the report referral response predictive time 132 using a method including (i) to (iv) described below.

(i) The information acquisition section 12 issues a read request for reading data having a fixed size (for example, 512 KB) from a predetermined logical volume through each of all paths 4 connected to the host device 2.

(ii) The information acquisition section 12 receives each response from the storage device 3 in response to the read request issued in (i), and stores differences of the received response times for respective paths 4 in the memory 20.

For example, when a response from the storage device 3 through a path "0" is 20 ms after issuing a Read IO command and a response from the storage device 3 through a path "1" is 10 ms after issuing a Read IO command, the difference of the response time becomes 20−10=10 ms between the path "0" and the path "1".

When the read requests are issued through the respective paths 4 to the predetermined logical volume, the fastest response is considered to be a response from the CM 100 in charge of the logical volume, and the response time of the fastest response is considered as a response time when the cross access does not occur. The response time of a response slower than the fastest response is considered as a response time when the cross access occurs. Accordingly, the difference between the response times described above may indicate a delay time due to the cross access, that is, a cross access delay time.

The information acquisition section 12 records the measured cross access delay time as the cross access delay time in management information 203. The information acquisition section 12 may acquire an average value of the cross access delay times obtained with regard to the plurality of paths 4, may acquire a maximum value or a minimum value, or may acquire otherwise.

(iii) The information acquisition section 12 causes the report referral issuance section 14 to issue a report referral at a timing after (ii), or a timing of receiving an initial IO request from a high-level application or the like.

(iv) The information acquisition section 12 measures the response time from the storage device 3 with respect to the report referral issued in (iii) described above. The response time measured as described above corresponds to the report referral response predictive time 132. The information acquisition section 12 records the measured response time as the report referral response time in management information 203.

The report referral determination section 13 determines whether or not to issue a report referral to the host device 2.

The report referral determination section 13 compares the cross access delay time calculated as described above with the report referral response predictive time 132 acquired from the storage device 3 to determine whether or not to issue a report referral on the basis of the comparison result.

When the report referral response predictive time 132 is shorter than the cross access delay time, a time from the issuance of a report referral to the reception of the response of the recommended path from the storage device 3 is shorter than an expected value of the delay time due to the cross access. That is, it means that the IO processing ends in a shorter time when a report referral is issued. Thus, in this case, the report referral determination section 13 determines to issue a report referral.

When the report referral response predictive time 132 is equal to or longer than the cross access delay time, the expected value of the delay time due to the cross access is shorter than a time from the issuance of a report referral to the reception of the response of the recommended path from the storage device 3. That is, even when the cross access occurs as a result of performing the IO processing, the processing ends in a time shorter than a time from the issuance of the report referral to the reception of the response of the recommended path from the storage device 3. Thus, the report referral determination section 13 determines not to issue a report referral.

The report referral issuance section 14 issues a report referral to the storage device 3. That is, the report referral issuance section 14 functions as a recommended path inquiry section which issues a report referral (recommended paths inquiry) to the storage device 3.

The report referral issuance section 14 issues a report referral when the report referral determination section 13 described above determines to issue a report referral.

The issuance of a report referral by the report referral issuance section 14 to the storage device 3 may be realized using a known method, and a description thereof will be omitted.

When the report referral determination section 13 determines not to issue a report referral, the issuance of a report referral by the report referral issuance section 14 is suppressed. That is, the report referral determination section 13 described above also function as a suppression control section which suppresses the issuance of the report referral.

The path management section 11 manages the paths 4 connecting the host device 2 with the storage device 3. For example, by checking a CA 104 of the storage device 3, which is connected through the communication cable to each HBA 21 included in the host device 2, the path management section 11 recognizes a connection state between the host device 2 and the storage device 3 through the paths 4 and forms the multipath. Method for forming the multipath between the host device 2 and the storage device 3 are known, and a description thereof will be omitted. The multipath is formed, for example, at the time of starting the host device 2.

The path management section 11 manages the paths 4 using path management information 201. The path management information 201 includes information on a path 4 used for issuing an IO command to a logical volume. Hereinafter, a path 4 used to issue an IO command may be referred to as a path 4 in charge. The path management information 201 includes information on a path 4 in charge for each chunk.

When the recommended path 4 is responded from the report referral response section 122 of the storage device 3 in response to the report referral issued by the report referral issuance section 14, the recommended path 4 is stored as the path 4 in charge in the path management section 11.

The path management information 201 is stored in a predetermined region of the RAM of the memory 102.

When the IO processing section 15 described below issues an IO command to the storage device 3, the path management section 11 refers to the path management information 201 with respect to the chunk (logical volume) which is subject to the IO processing. When a recommended path 4 is registered (cache hit) in the path management information 201, the path management section 11 selects, out of the plurality of paths 4 connected to the host device 2, the path 4 stored in the path management information 201 as the path 4 in charge. Hereinafter, the path management information 201 may be referred to as a path information cache 201.

In a case in which the report referral issuance section 14 issues a report referral when the path 4 in charge of the chunk (logical volume) which is subject to the IO processing is not registered (cache miss) in the path information cache 201, the path management section 11 selects the recommended path 4 as the path 4 in charge in accordance with the response received from the storage device 3 (report referral response section 122) in response to the report referral.

In a case in which the report referral issuance section 14 does not issue a report referral when the path 4 in charge of the chunk which is subject to the IO processing is not registered in the path information cache 201, the path management section 11 selects a predetermined path 4 which is set in advance as a default of the path 4 in charge, for example. In a case in which the path 4 in charge of the chunk which is subject to the IO processing is not registered in the path information cache 201, but the path 4 in charge of each logical volume is stored, the path management section 11 adopts the path 4 in charge of the logical volume.

The IO processing section 15 issues an IO command or the like to the storage device 3 to perform the writing and reading of the data to and from the storage region provided by the storage device 3.

The IO processing section 15 issues the IO command using the path 4 which is selected by the path management section 11.

The IO processing to the storage device 3 by the IO processing section 15 may be realized by a known method, and a description thereof will be omitted.

Figure 5:
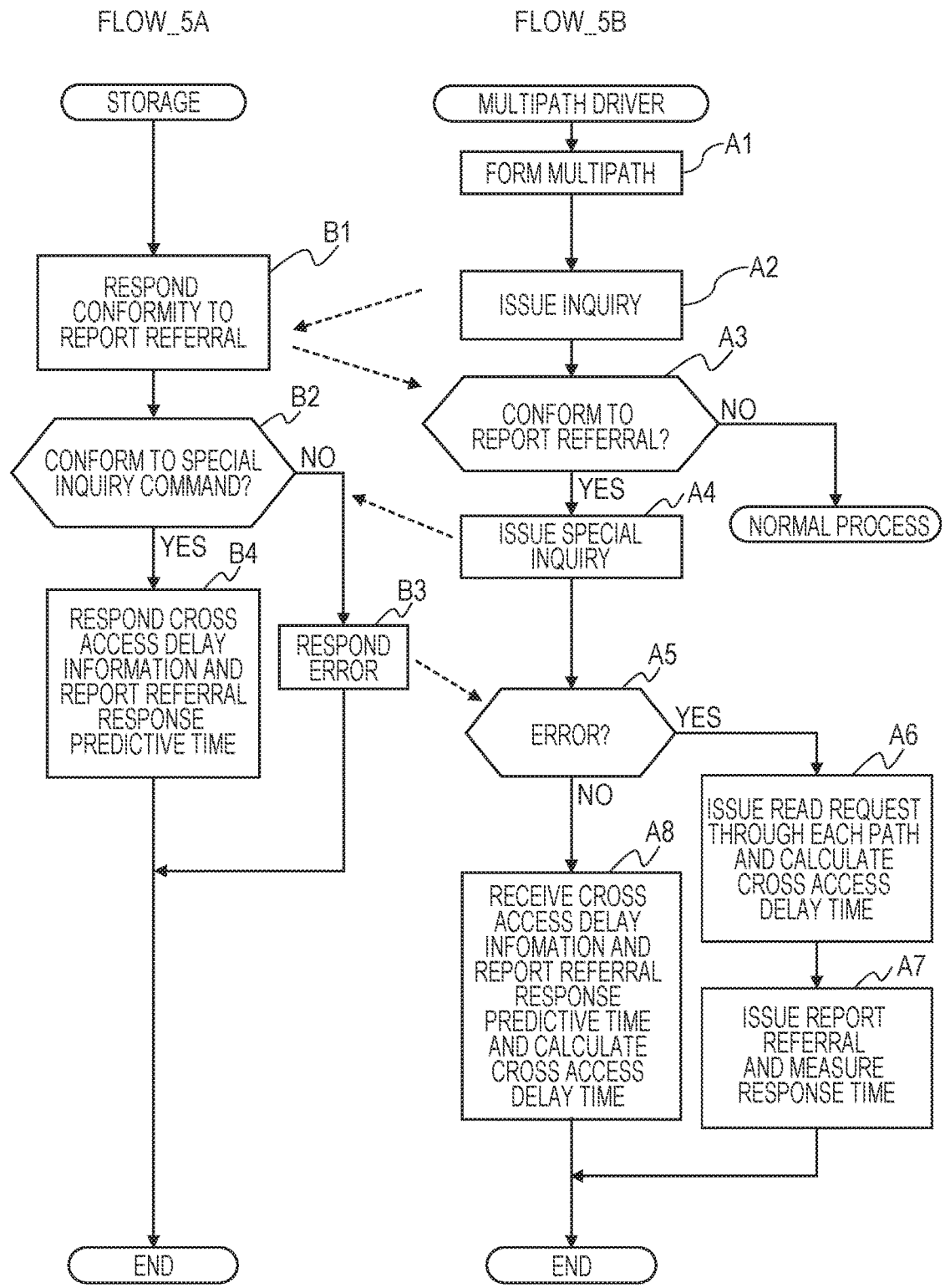
FIG. 5 illustrates flow charts for describing an exemplary process of a multipath driver during system start-up of a storage system according to an embodiment.

Processing performed by the multipath driver 5 during system start-up of the storage system 1 according to the embodiment, which is configured as described above, will be described with reference to flow charts illustrated in FIG. 5. FLOW_5A is a flow chart illustrating processing performed by the storage device 3, and FLOW_5B is a flow chart illustrating processing performed by the multipath driver 5 of the host device 2.

In the host device 2, the path management section 11 forms the multipath (A1).

In the host device 2, the information acquisition section 12 issues an inquiry command to the storage device 3 (A2).

In the storage device 3, the information response section 121 responds that the storage device 3 conforms to a report referral, in response to the received inquiry command (B1).

In the host device 2, on the basis of the response received from the storage device 3, the information acquisition section 12 determines whether or not the storage device 3 conforms to a report referral (A3). When it is determined that the storage device 3 does not conform to a report referral (NO in A3), the multipath driver 5 ends the system start-up, and the processing proceeds to a normal processing as the host device 2.

When it is determined that the storage device 3 conforms to a report referral (YES in A3), the processing proceeds to A4.

The information acquisition section 12 issues a special inquiry command to the storage device 3 (A4).

In the storage device 3, the information response section 121 determines whether or not the storage device 3 conforms to a special inquiry command (B2). When it is determined that the storage device 3 does not conform to a special inquiry command (NO in B2), the information response section 121 responds an error (B3), and the processing ends.

When it is determined that the storage device 3 conforms to a special inquiry command (YES in B2), the information response section 121 responds the cross access delay information 131 and the report referral response predictive time 132 to the host device 2 in response to the special inquiry command (B4), and the processing ends.

In the host device 2, the information acquisition section 12 determines whether or not an error is responded from the storage device 3 (A5).

When it is determined that the host device 2 receives the response of an error from the storage device 3 (YES in A5), the storage device 3 does not have a function conforming to a special inquiry command.

Therefore, the information acquisition section 12 issues a read request for reading data of a fixed size (for example, 512 KB) to a predetermined logical volume through all paths 4 connected to the host device 2 (A6). In addition, the information acquisition section 12 receives a response from each storage device 3 in response to the issued read request, and records the difference between the response times of responses received through the respective paths 4 to the management information 203 in the memory 102 as the cross access delay time.

The information acquisition section 12 causes the report referral issuance section 14 to issue a report referral, and measures a response time. The information acquisition section 12 records the measured response time as the report referral response time in the management information 203 (A7), and the processing ends.

When it is determined that a response of an error is not received (NO in A5), the storage device 3 has a function conforming to a special inquiry command.

Therefore, the information acquisition section 12 receives the cross access delay information 131 and the report referral response predictive time 132 from the storage device 3. The information acquisition section 12 calculates a cross access delay time on the basis of the received cross access delay information 131, and records the calculated cross access delay time as the cross access delay time to the management information 203 in the memory 102 (A8).

In addition, the information acquisition section 12 records the received report referral response predictive time 132 to the management information 203 in the memory 102 as the report referral response time. After that, the processing ends.

Figure 6:
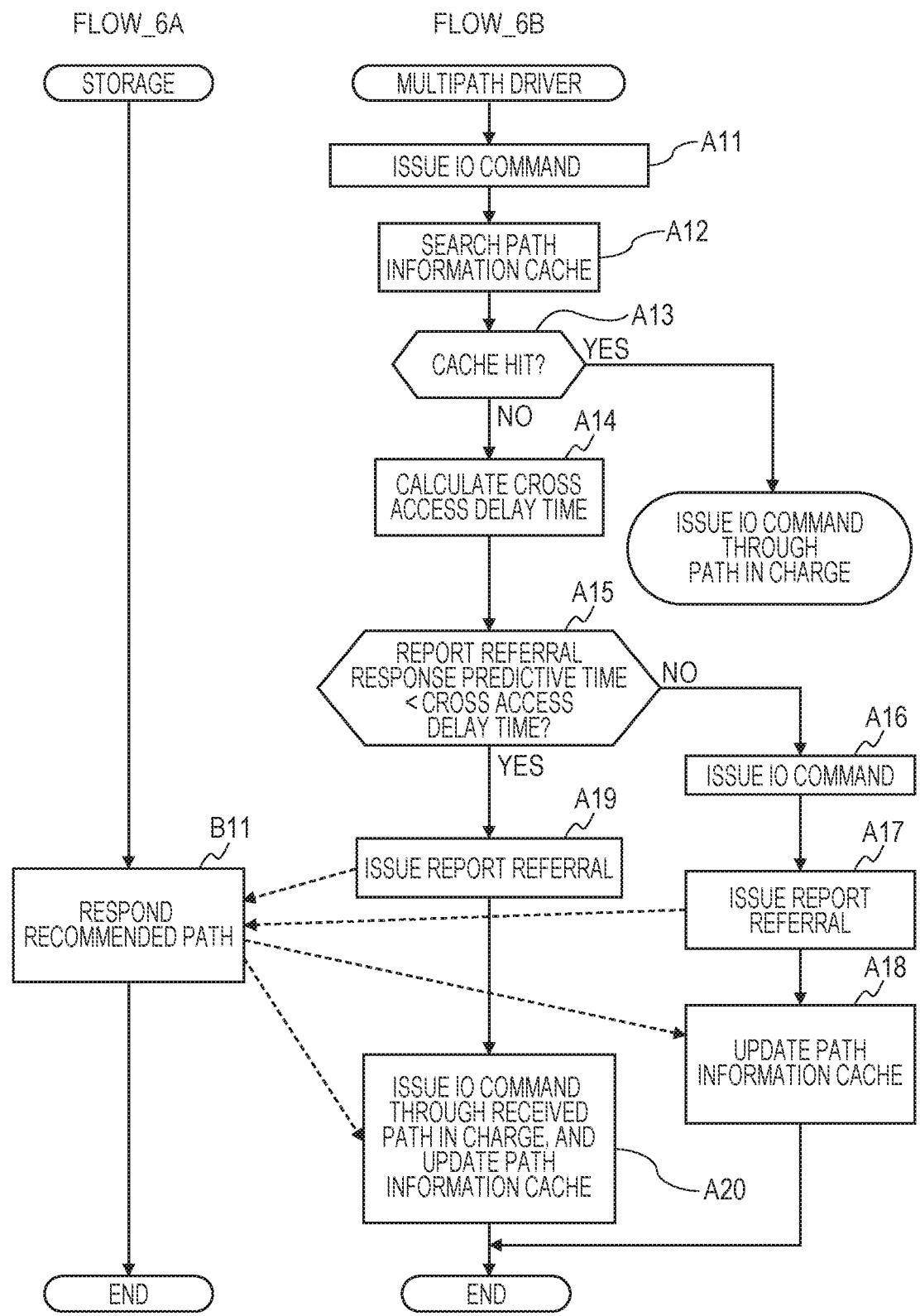
FIG. 6 illustrates flow charts for describing an exemplary process of a multipath driver during IO processing of a storage system according to an embodiment.
Figure 7:
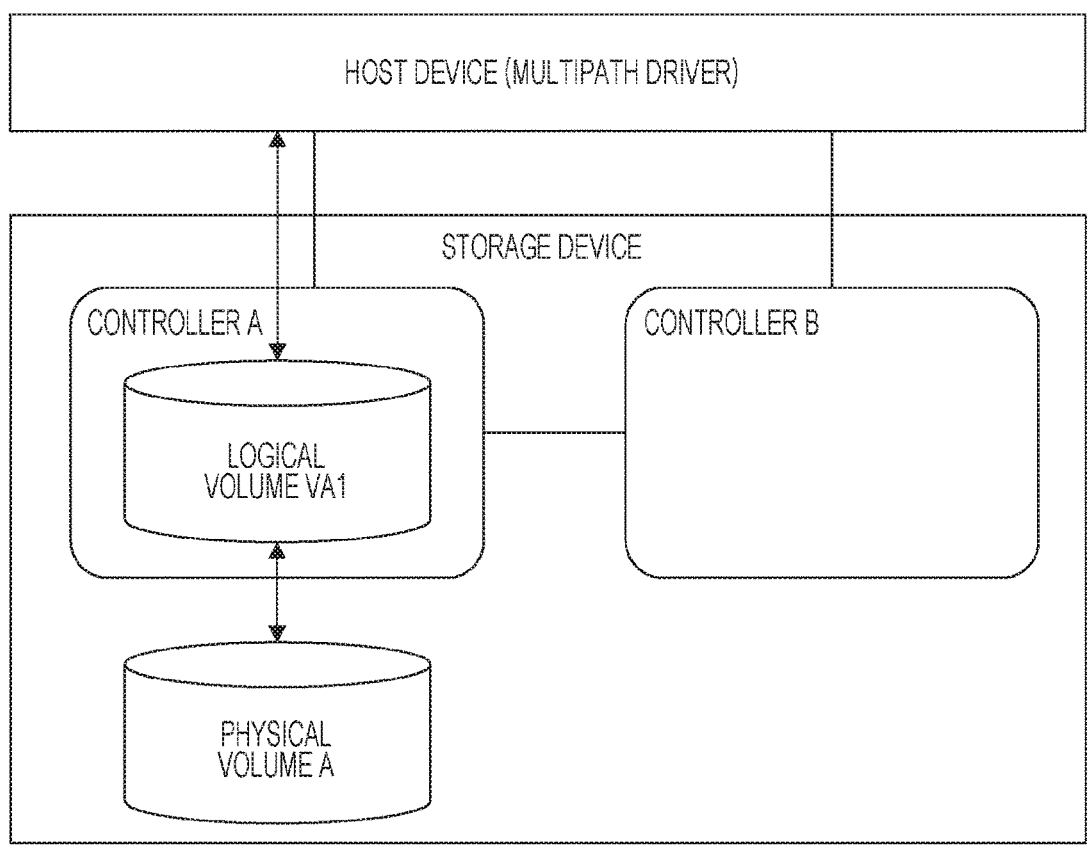
FIG. 7 is a diagram for describing a path management method in a related art using TPGS.
Figure 8:
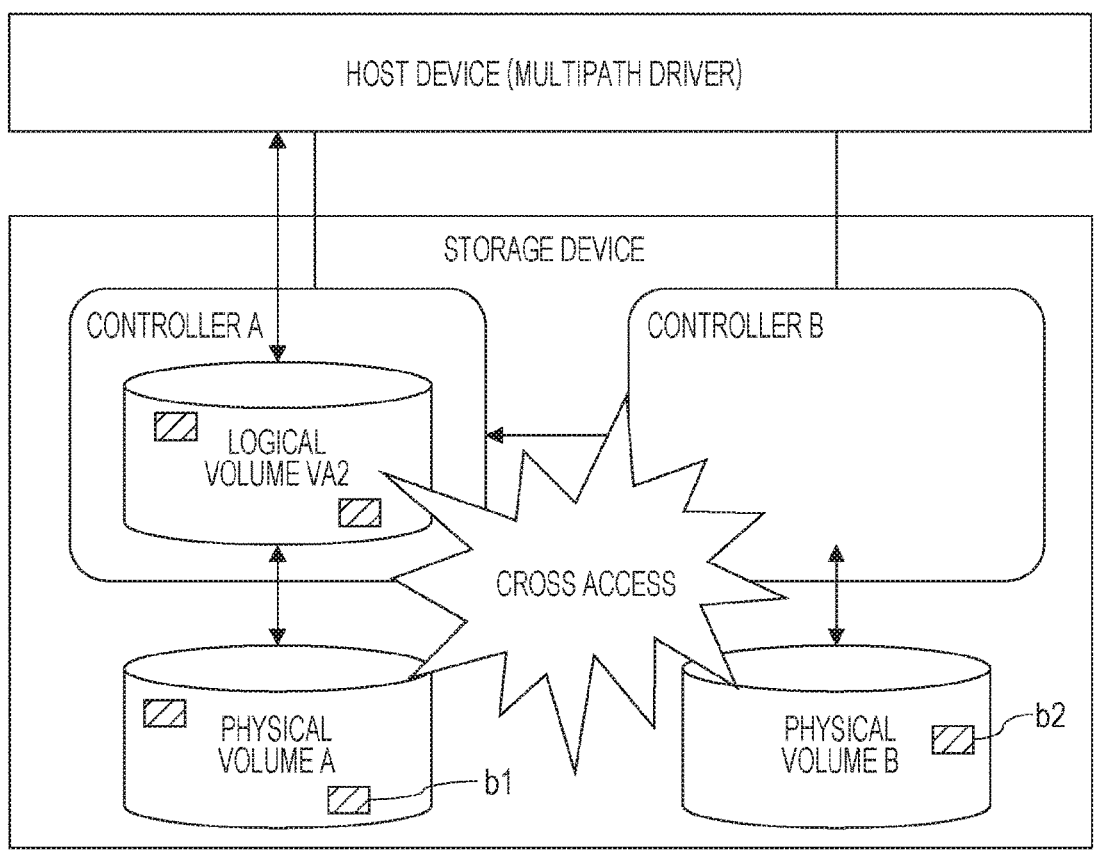
FIG. 8 is a diagram for describing a path management method in a related art using TPGS.
Figure 9:
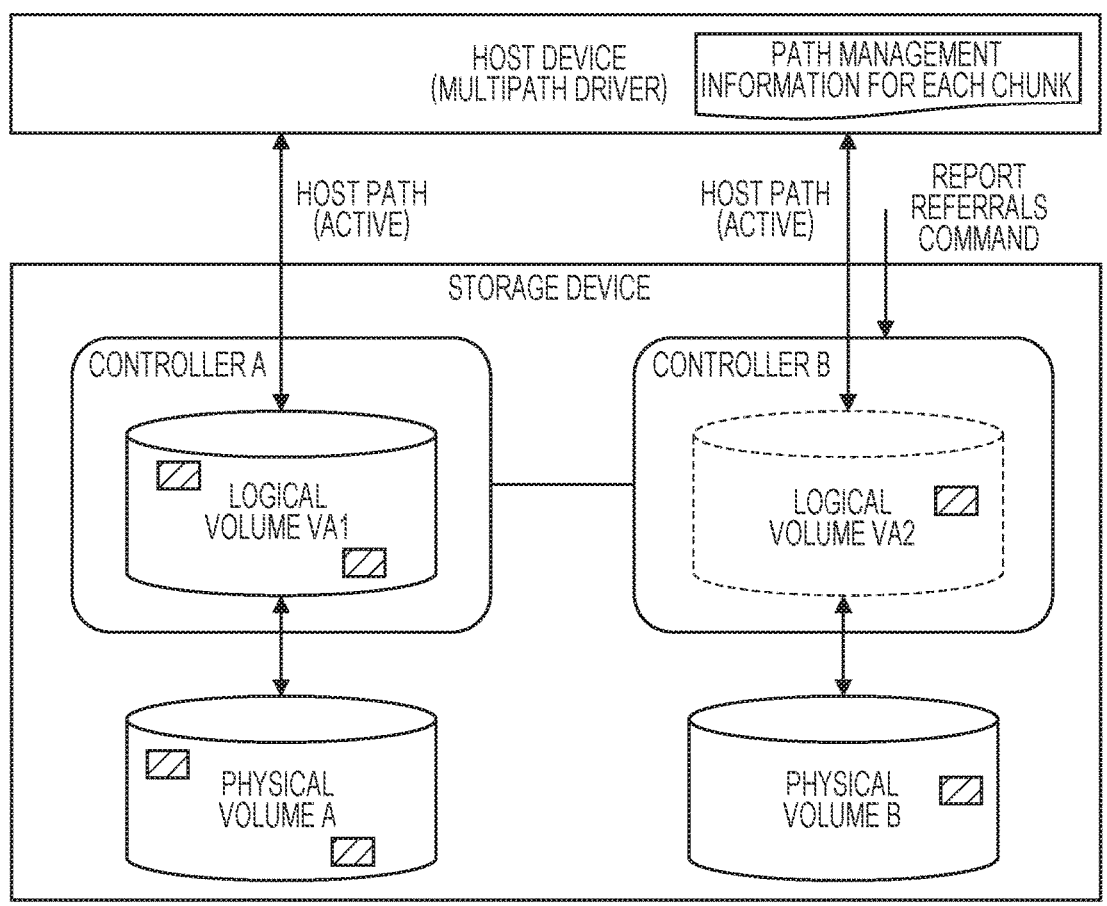
FIG. 9 is a diagram for describing the referral specification.

Next, processing performed by the multipath driver 5 during the IO processing of the storage system 1 according to the embodiment, which is configured as described above, will be described with reference to flow charts illustrated in FIG. 6.

FLOW_6A is a flow chart illustrating processing performed by the storage device 3, and FLOW_6B is a flow chart illustrating processing performed by the multipath driver 5 of the host device 2.

In the host device 2, when the IO processing section 15 issues an IO command to the storage device 3 (A11), the path management section 11 searches the path information cache 201 on the basis of the chunk which is subject to the IO processing (A12).

The path management section 11 determines whether or not a cache hit occurs in the path information cache 201 (A13). When a cache hit occurs (YES in A13), the path management section 11 selects a path 4 in charge which is recorded in the path information cache 201, and the IO processing section 15 transmits the IO command and the like through the selected path 4 in charge. Then, the processing ends.

When a cache miss occurs in the path information cache 201 (NO in A13), the processing proceeds to A14.

The information acquisition section 12 of the host device 2 calculates a cross access delay time on the basis of the IO size of data which is subject to the IO processing and the cross access delay information 131 indicating a delay time of data having a unit IO size using the above described Expression (1) (A14).

The report referral determination section 13 of the host device 2 compares the calculated cross access delay time and the report referral response predictive time 132 acquired from the storage device 3 (A15).

When it is determined that the report referral response predictive time is shorter than the cross access delay time (YES in A15), the report referral determination section 13 determines to issue a report referral.

In the host device 2, the report referral issuance section 14 issues a report referral to the storage device 3 (A19).

In the storage device 3, the report referral response section 122 responds a recommended path 4 for the block (chunk) in response to the report referral (B11).

In the host device 2, the path management section 11 selects, as a path 4 in charge, the recommended path 4 responded from the storage device 3 in response to the report referral, and the IO processing section 15 issues the IO command through the path 4 in charge (A20). In addition, the path management section 11 records the recommended path 4 responded from the storage device 3 in the path information cache 201, and the processing ends.

When it is determined that the report referral response predictive time is equal to or longer than the cross access delay time (NO in A15), the report referral determination section 13 determines not to issue a report referral.

Accordingly, in the host device 2, the path management section 11 selects, for example, a predetermined path 4 which is set in advance as a default of the path 4 in charge, and the IO processing section 15 issues the IO command through the selected path 4 in charge (A16).

In addition, in the host device 2, asynchronously with the issuance of the IO command by the IO processing section 15 in A16, the report referral issuance section 14 issues a report referral to the storage device 3 (A17).

In the storage device 3, the report referral response section 122 responds a recommended path 4 for the block (chunk) in response to the report referral (B11).

In the host device 2, the path management section 11 records the recommended path 4 responded from the storage device 3 in response to the report referral in the path information cache 201 (A18). Accordingly, the path information cache 201 is updated and a processing speed of IO processing performed later on the same chunk may be improved. After that, the processing ends.

As described above, the storage system 1 according to the embodiment determines whether or not to issue a report referral to the storage device 3 by comparing a cross access delay time with a report referral response predictive time when the host device 2 issues an IO command.

Specifically, when it is determined that the report referral response predictive time 132 is equal to or longer than the cross access delay time, the report referral determination section 13 determines not to issue the report referral, and the IO processing section 15 performs the IO processing, for example, using a predetermined path 4 which is set in advance as a default.

Accordingly, a delay generated by issuing a report referral is excluded, and the IO processing may be performed efficiently.

When it is determined that the report referral response predictive time 132 is shorter than the cross access delay time, the report referral determination section 13 determines to issue a report referral. Accordingly, the report referral issuance section 14 issues a report referral, and the IO processing section 15 performs the IO processing using a recommended path 4 responded from the storage device 3 (report referral response section 122) in response to the report referral.

Accordingly, the IO processing may be performed efficiently through the recommended path 4 notified in response to the report referral.

In the storage device 3 having the thin provisioning function, generally, it is important that a thin provisioning volume may be formed without considering the CM 100 in charge at the time of forming or changing the thin provisioning volume, whereby the cross access normally occurs. According to the embodiment, the IO processing may be performed in an appropriate way for each chunk in the storage device 3 having the thin provisioning function.

When the report referral determination section 13 determines not to issue a report referral and the IO processing section 15 issues an IO command to the storage device 3, the report referral issuance section 14 issues a report referral to the storage device 3 asynchronously with the issuance of the IO command. The report referral response section 122 of the storage device 3 registers, in the path information cache 201, a recommended path 4 responded in response to the report referral, thereby improving a processing speed of IO processing which is performed later with respect to the same chunk.

Technologies disclosed herein are not limited to the above described embodiment, and may be realized by being variously modified within a range not departing from the scope of the embodiment. Each configuration and processing of the embodiment may be selected as necessary, or may be appropriately combined with each other.

For example, in the embodiment described above, the number of the host devices 2 included in the storage system 1 or the number of the storage devices 3 may be appropriately changed. In addition, the number of the CMs 100 included in the storage device 3 may be one or may be three or more.

Regarding the cross access delay information 131 transmitted from the storage device 3 to the host device 2 as the response information, the unit IO size is not limited to 512 KB, and may be appropriately modified.

The embodiment may be realized and manufactured by a person skilled in the art using the disclosure described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus connected through a plurality of paths to a plurality of controllers included in a storage device, the information processing apparatus comprising:
   a processor configured to
      issue, to the storage device, an inquiry about a recommended path through which a data access command is to be issued to the storage device, the recommended path being one of the plurality of paths,
      acquire a delay reference value,
      calculate a delay predictive time based on the delay reference value,
      compare the delay predictive time with a response predictive time in regard to the data access command, the delay predictive time being a predictive value of a delay time due to a data communication using an inter-controller communication between the plurality of controllers and being based on a total number of the plurality of paths, the response predictive time being a predictive value of a response time when the inquiry is issued to the storage device, and
      suppress the issuance of the inquiry when the response predictive time is equal to or longer than the delay predictive time.

2. The information processing apparatus according to claim 1, wherein the processor is further configured to issue the inquiry when the response predictive time is shorter than the delay predictive time.

3. The information processing apparatus according to claim 1, wherein the processor is further configured to acquire the delay reference value and the response predictive time from the storage device.

4. The information processing apparatus according to claim 1, wherein the processor is further configured to
   issue a first data access command through each of the plurality of paths to the storage device,
   measure response times of responses to the first data access command through the respective paths, and
   calculate the delay predictive time on basis of differences between the response times.

5. The information processing apparatus according to claim 1, wherein the processor is further configured to
   issue the inquiry to the storage device, upon suppressing the issuance of the inquiry and issuing the data access command to the storage device,
   receive recommended path information from the storage device, the recommended path information being transmitted from the storage device in response to the inquiry, and
   store the recommended path information in a path information cache.

6. A multipath control method, comprising:
   issuing to a storage device, by a computer, an inquiry about a recommended path through which a data access command is to be issued to the storage device, the storage device including a plurality of controllers connected to the computer through a plurality of paths, the recommended path being one of the plurality of paths;

acquiring a delay reference value;

calculating a delay predictive time based on the delay reference value;

comparing the delay predictive time with a response predictive time in regard to the data access command, the delay predictive time being a predictive value of a delay time due to a data communication using an inter-controller communication between the plurality of controllers and being based on a total number of the plurality of paths, the response predictive time being a predictive value of a response time when the inquiry is issued to the storage device; and suppressing the issuance of the inquiry when the response predictive time is equal to or longer than the delay predictive time.

7. The multipath control method according to claim 6, further comprising:

issuing the inquiry when the response predictive time is shorter than the delay predictive time.

8. The multipath control method according to claim 6, further comprising: acquiring the delay reference value and the response predictive time from the storage device.

9. The multipath control method according to claim 6, further comprising:

issuing a first data access command through each of the plurality of paths to the storage device;

measuring response times of responses to the first data access command through the respective paths; and calculating the delay predictive time on basis of differences between the response times.

10. The multipath control method according to claim 6, further comprising:

issuing the inquiry to the storage device, upon suppressing the issuance of the inquiry and issuing the data access command to the storage device;

receiving recommended path information from the storage device, the recommended path information being transmitted from the storage device in response to the inquiry; and storing the recommended path information in a path information cache.

11. A computer-readable recording medium having stored therein a program that causes a computer to execute a process, the process comprising:

issuing, to a storage device, an inquiry about a recommended path through which a data access command is to be issued to the storage device, the storage device including a plurality of controllers connected to the computer through a plurality of paths, the recommended path being one of the plurality of paths;

acquiring a delay reference value;

calculating a delay predictive time based on the delay reference value;

comparing the delay predictive time with a response predictive time in regard to the data access command, the delay predictive time being a predictive value of a delay time due to a data communication using an inter-controller communication between the plurality of controllers and being based on a total number of the plurality of paths, the response predictive time being a predictive value of a response time when the inquiry is issued to the storage device; and suppressing the issuance of the inquiry when the response predictive time is equal to or longer than the delay predictive time.

12. The computer-readable recording medium according to claim 11, the process further comprising: issuing the inquiry when the response predictive time is shorter than the delay predictive time.

13. The computer-readable recording medium according to claim 11, the process further comprising: acquiring the delay reference value and the response predictive time from the storage device.

14. The computer-readable recording medium according to claim 11, the process further comprising:

issuing a first data access command through each of the plurality of paths to the storage device;

measuring response times of responses to the first data access command through the respective paths; and calculating the delay predictive time on basis of differences between the response times.

15. The computer-readable recording medium according to claim 11, the process further comprising:

issuing the inquiry to the storage device, upon suppressing the issuance of the inquiry and issuing the data access command to the storage device;

receiving recommended path information from the storage device, the recommended path information being transmitted from the storage device in response to the inquiry; and storing the recommended path information in a path information cache.

* * * * *